United States Patent [19]
Lauffer et al.

[11] Patent Number: 4,713,827
[45] Date of Patent: Dec. 15, 1987

[54] TERMINATOR FOR A CMOS TRANSCEIVER DEVICE

[75] Inventors: Donald K. Lauffer, Poway; Gregory H. Milby; Paul M. Rostek, both of San Diego; Ikuo J. Sanwo, San Marcos, all of Calif.

[73] Assignee: NCR Corporation, Dayton, Ohio

[21] Appl. No.: 929,122

[22] Filed: Nov. 10, 1986

[51] Int. Cl.$^4$ ............................................. H04L 25/12
[52] U.S. Cl. ......................................... 375/7; 375/36; 455/79; 333/130
[58] Field of Search ................... 375/7, 8, 36; 455/78, 455/79, 82; 178/63 R, 69 R; 333/101, 105, 124, 130; 379/398; 307/273

[56] References Cited

U.S. PATENT DOCUMENTS

| | | | |
|---|---|---|---|
| 3,373,360 | 3/1968 | Wilson | 333/105 |
| 4,056,735 | 11/1977 | Caswell | 307/273 |
| 4,384,356 | 5/1983 | Beerbaum | 375/36 |
| 4,594,724 | 6/1986 | Hogan | 375/7 |
| 4,646,319 | 2/1987 | Engel et al. | 375/7 |

*Primary Examiner*—Benedict V. Safourek
*Attorney, Agent, or Firm*—Wilbert Hawk, Jr.; Edward Dugas; Floyd A. Gonzalez

[57] ABSTRACT

A terminator for a transceiver device for transmitting data signals to and receiving data signals from a second transceiver device over a transmission line therebetween. The terminator has a transmitter connected to the transmission line for transmitting data signals to the second transceiver device, a receiver connected to the transmission line for receiving data signals from the second transceiver device, a termination resistor connected to the transmission line for improving the transmission characteristics of the transmission line, and a switch device between the termination resistor and the transmission line. The switch device is closed for a portion of the time when the receiver is receiving data signals from the second transceiver device such that when it is closed the termination resistor is connected to the transmission line, and is open for the remainder to the time such that when it is open the termination resistor is not connected to the transmission line.

6 Claims, 1 Drawing Figure

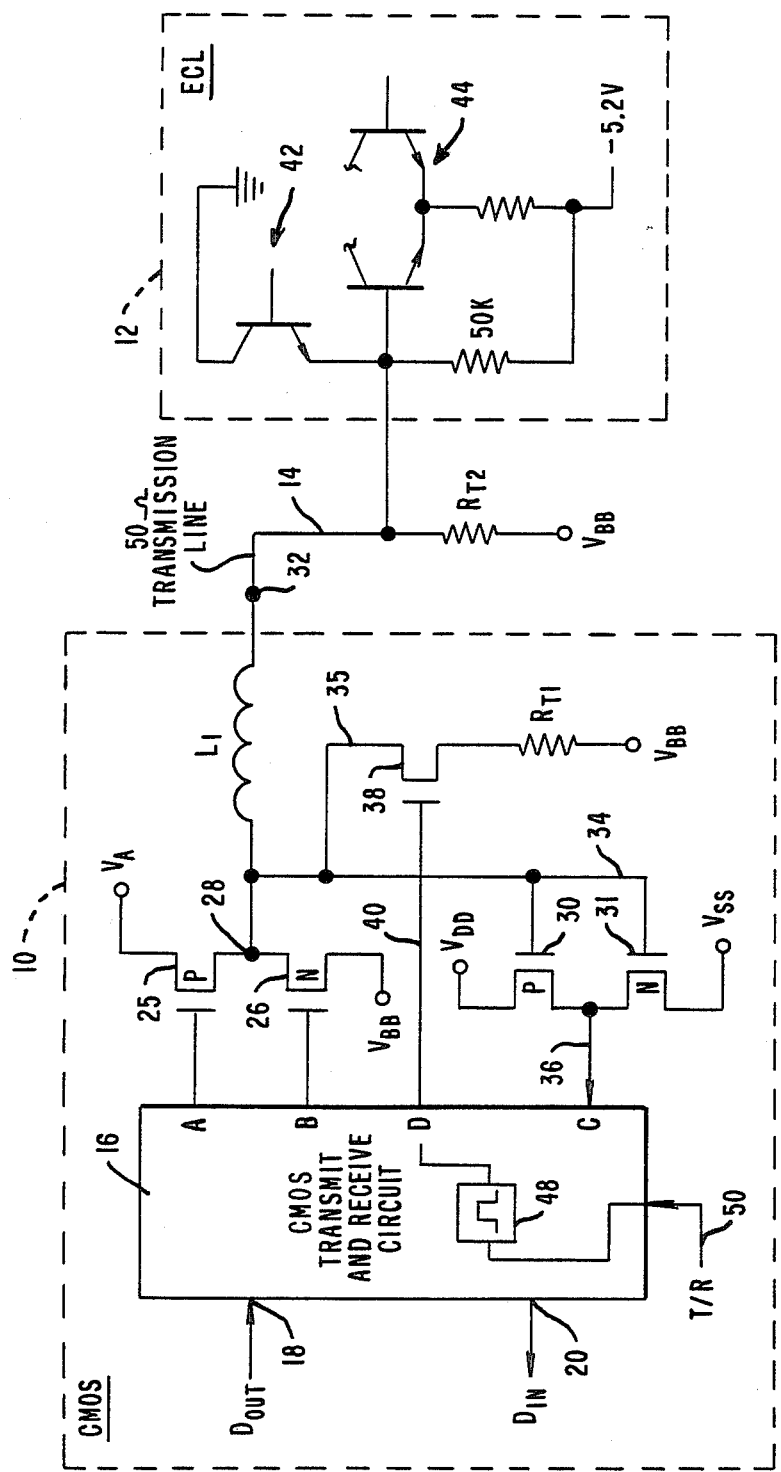

TERMINATOR FOR A CMOS TRANSCEIVER DEVICE

BACKGROUND OF THE INVENTION

The present invention is related to the transmission of data between integrated circuit devices, and is more particularly related to the termination of CMOS transceiver devices connected to a bi-directional data transmission bus.

In the bi-directional transmission of data over a data bus between two electronic modules, it is typical to terminate the transmission lines of the data bus with resistors to provide proper impedance matching for prevent ringing of the transmission line. In a high speed data transmission system it is desirable to have termination resistors at each end of each transmission line such that voltage level changes are quickly propagated from the transmitting electronic module to the receiving electronic module. However, it is undesirable to terminate both ends of the transmission line throughout the normal period of data transmission because the transmitting electronic module must supply sufficient DC current to drive both of the termination resistors. This current supply results in DC power requirements which must be met by the transmitting electronic module. Where the electronic module is supporting a large number of transmission lines, the DC power requirements which must be met by the electronic module can be considerable. It is not uncommon in transmission systems for an electronic module to be required to drive sixty-four or more transmission lines in a single transmission bus. It is also desirable to include the termination resistor in intimate relationship with the receiver input of the electronic module such that the receiver is not isolated by the package pin inductance of the pin connection between the electronic module and the transmission line.

Japanese Pat. No. 56-79551 to Motoaki Yamazaki for "Bus Line Termination System" discloses in FIG. 1, a terminating resistor inside of the line transceiver device.

U.S. Pat. No. 3,863,024 to Caragliano et al. for "Directional Coupled Data Transmission System" issued Jan. 28, 1975, and discloses a transmission system having a transmitter 10, a receiver 14 and a transmission line 12 therebetween with the transmission line terminated by terminal resistors at the receiver end of the transmission line.

U.S. Pat. No. 4,380,822 to Broton for "Transmit-Receive Switching Circuit For Radio Frequency Circulators" issued Apr. 19, 1983, and discloses a transmit-receive switching circuit wherein a load resistor 151 is shorted out when the circuit is in the receive mode.

U.S. Pat. No. 4,434,497 to Rolfe for "Response Time Bidirectional Circuitry" issued Feb. 28, 1984, and discloses bidirectional circuitry which includes two buses, two interrupt transistors and two amplifiers, each amplifier having a capacitor connected between an input and an output terminal thereof. The bidirectional circuitry acts to provide amplification and/or level shifting of information between two transceivers while also reducing capacitive loading and thus enhancing response time. U.S. Pat. No. 4,443,882 to Rolfe for "Single Terminal Negative Capacitance Generator For Response Time Enhancement" issued Apr. 17, 1984, and discloses a circuit similar to U.S. Pat. No. 4,434,497, but which has a single bus and a single amplifier.

U.S. Pat. No. 4,528,677 to Ise et al. for "Data Transmission System" issued July 9, 1985 and disclosed a data transmission system including a pair of parallel transmission lines, wherein data signals on the transmission lines are applied through a transformer and an associated impedance connected across the lines. The impedance is tuned to the transmission frequency so that it has a very low value during data transmission. A switching means is switched on when signals are transmitted from one of the transmitting stations so that an impedance element does not function either as a load or another transmission system.

SUMMARY OF THE INVENTION

In a specific embodiment, a terminator is disclosed for a transceiver device for transmitting data signals to and receiving data signals from a second transceiver device over a transmission line therebetween. The terminator has a transmitter connected to the transmission line for transmitting data signals to the second transceiver device, a receiver connected to the transmission line for receiving data signals from the second transceiver device, a termination resistor connected to the transmission line for improving the transmission characteristics of the transmission line, and a switch device between the termination resistor and the transmission line. The switch device is closed for a portion of the time when the receiver is receiving data signals from the second transceiver device such that when it is closed the termination resistor is connected to the transmission line, and is open for the remainder to the time such that when it is open the termination resistor is not connected to the transmission line.

A primary object of the present invention is to provide a termination device for a CMOS integrated circuit wherein the termination device includes a termination resistor which is switched into connection with a transmission line when data is being transmitted over the transmission line for receipt by the termination device.

It is another object of the present invention to provide a termination device wherein a termination resistor is switched into connection with a transmission line during only a portion of the time when data is being transmitted over the transmission line to the termination device.

It is a further object of the present invention to provide a termination device having a termination resistor which is not isolated from the termination device by the inductance of a package pin connecting the termination device to a transmission line.

These and other objects of the present invention will have become apparent from the description of the preferred embodiment and the drawing herein.

BRIEF DESCRIPTION OF THE DRAWING

The FIGURE shows a transmission system having a CMOS transceiver device, and ECL transceiver device, a transmission line for transmitting data therebetween, and wherein the CMOS transceiver device includes a terminator of the present invention.

DESCRIPTION OF THE PREFERRED EMBODIMENT

The FIGURE is a schematic diagram of a transmission circuit using the present invention. The transmission circuit includes a CMOS integrated circuit device 10 for receiving data from, and transmitting data to, for instance, an ECL integrated circuit device 12. A transmission bus extends from the CMOS device 10 to the ECL device 12. The transmission bus may include a plurality of transmission lines, one of which is shown as 14.

The CMOS device 10 includes a transmitreceive or transceiver circuit 16. The transceiver circuit 16 includes a $D_{out}$ pin 18 for receiving a data bit from the CMOS circuit, and a $D_{in}$ terminal 20 for providing a data bit to the CMOS integrated circuit device 10.

The transceiver circuit 16 has a pair of transmission outputs A and B which are connected to the gates of a pair of output driver transistors 25 and 26 respectively. The output driver transistors 25 and 26 are typically output drivers for ECL voltage levels, or other terminated system voltages. The output terminal A is connected to the gate of transistor 25 which is a P channel field effect transistor (FET) whose source is connected to voltage $V_A$, and whose drain is connected to an output node 28 for the terminator circuit. The output terminal B is connected to the gate of transistor 26 which is an N channel FET whose source is connected to voltage $V_{BB}$ and its drain is connected to the output node 28. The output node 28 is connected via a package pin at input/output terminal 32 to one end of the transmission line 14. The package pin inductance is represented by the inductance $L_1$, which typically has a value of fifteen nanohenries. It will be understood that when terminal A is low, transistor 25 will be on, and that when terminal B is high, transistor 26 will be turned on. Thus, when both terminals A and B are low, the output on node 28 is high, and when the outputs A and B are high, the node 28 is low. When terminal A is high and terminal B is low, transistors 25 and 26 are turned off and the output node 28 is in a floating condition.

A receive inverter formed of transistors 30 and 31 have their gates connected to the input/output terminal 32 via a conductor 34. Transistors 30 and 31 are designed such that they interpret ECL voltage levels on the transmission line 14 for input into an input terminal C of the transceiver circuitry 16. Transistor 30 is a P channel FET having its source connected to $V_{DD}$ and its drain connected to an input conductor 36 leading to the input terminal C. Transistor 31 is an N channel FET having its source connected to voltage $V_{SS}$ and its drain connected to conductor 36. A termination resistor $R_{T1}$ is switched in and out of the circuit by a transistor 38. The transistor 38 is an N channel FET having its gate connected to an enable output D of the transceiver circuit 10 by conductor 40. The source of transistor 38 is connected to one end of the terminating resistor $R_{T1}$, and the drain is connected to the input/output terminal 32 of the termination circuit via conductors 34 and 35. The other end of the termination resistor $R_{T1}$ is connected to voltage $V_{BB}$.

The other end of the transmission line 14 is terminated by a termination resistor $R_{T2}$ whose other end is connected to $V_{BB}$. The ECL circuit 12 includes a transmitter shown schematically at 42 and an ECL current switch forming an ECL receiver at 44. The ECL transmitter 42 and the ECL receiver 44 will not be described further as they are of typical construction for transmitting and receiving data bits via the transmission line 14 at typical ECL voltage levels.

Typical values of the parameters of the termination circuit are as follows:

$V_A = -0.8$ volts;

$V_{BB} = -2.0$ volts;

$V_{SS} = -3.3$ volts;

$V_{DD} =$ ground;

The turned on resistances of the transistors 25, 26 and 38 are each approximately 5 ohms, and the impedances of the transmission line 14 and the termination resistors $R_{T1}$ and $R_{T2}$ are approximately 50 ohms each.

Typically, a transmit-receive (T/R) signal on conductor 50 is provided by appropriate logic either internal to the CMOS integrated circuit device 10 or external to the circuitry shown, and either reflects or controls the transmission status of the transceiver circuit 16. Preferably, the enabling output D is enabled to turn on the transistor 38 for a set period of time, typically twenty percent, of the receive time of each data bit from the transmission line 14. Thus, the terminating resistor $R_{T1}$ needs to be driven only for a length of time sufficient to receive the leading edge of a data bit from the ECL device 12 over transmission line 14 to the CMOS device 10. For the remainder of the time, the transistor 38 may remain open such that the termination resistor $R_{T1}$ is not driven. This may be done by placing a monostable multivibrator or one-shot device 48 having its input connected to the conductor 50 for receiving the T/R signal and its output connected to the enabling terminal D of the transceiver circuit 16. Thus, for a set length of time after the T/R signal is enabled, the enabling output terminal D will be enabled turning on the transistor 38 and thereby switching the termination register $R_{T1}$ into the circuit.

It will be understood that the CMOS integrated circuit device 10 may contain as many transceiver circuits 16 and input/output terminals as desired for connecting a plurality of transmission lines in a transmission bus to an ECL circuit device 12. It will also be understood, that with the termination resistor $R_{T1}$ physically located inside the CMOS integrated circuit device 10, it will not be isolated from the circuit device 10 by the inductance of the package pin inductance represented by the inductor $L_1$. It will also be understood that the present design is not limited to a 50 ohm transmission line and associated termination resistors, but may be applied to any value of transmission line impedance. Further, the voltage levels chosen may be used for any voltage levels of a terminated transmission system.

Thus, a system has been described which provides the aforementioned objects. It will be understood by those skilled in the art that the disclosed embodiment is exemplary only, and that various elements disclosed may be replaced by equivalents without departing from the invention hereof, which equivalents are covered by the appended claims.

What is claimed is:

1. A terminator for a transceiver device transmitting data signals to and receiving data signals from a second transceiver device over a transmission line therebetween, said terminator comprising:
    a transmitter connected to the transmission line for transmitting data signals to the second transceiver device;
    a receiver connected to the transmission line for receiving data signals from the second transceiver device;

a termination resistor connected to the transmission line for improving the transmission characteristics of the transmission line;

switch means between said termination resistor and the transmission line, said switch means having a first closed state wherein said transmission resistor is connected to the transmission line, and a second opened state wherein said termination resistor is not connected to the transmission line; and control means in said switch means for placing said switch means in said first closed state for a set portion of the time that said receiver is receiving data from the second transceiver device.

2. The terminator of claim 1 wherein said receiver receives data during a receive time, said terminator further comprising timing means in said control means for generating a signal for a set time after the start of said receive time, and connection means between said timing means and said switch means for changing said switch means from its second state to its first state during the generation of the signal from said timing means.

3. The terminator of claim 2 wherein said timing means is a monostable multivibrator, and said switch means is a field effect transistor having its gate connected to the output of said monostable multivibrator.

4. The terminator of claim 2 wherein the set time of said timing device is about twenty percent of said receive time.

5. The terminator of claim 2 wherein said transmitter is designed to transmit data signals from a CMOS device to an ECL device, and said receiver is designed to receive data signals from an ECL device and translate them to signals for a CMOS device.

6. The terminator of claim 5 comprising pin means for connecting said terminator to the transmission line, said termination resistor being intimate to the terminator such that said pin means is between said termination resistor and the connected transmission line.

* * * * *